Aug. 28, 1951 W. B. CLIFFORD ET AL 2,565,949
PROCESS AND APPARATUS FOR MOLDING SHEET MATERIAL
Filed April 12, 1947 2 Sheets-Sheet 1
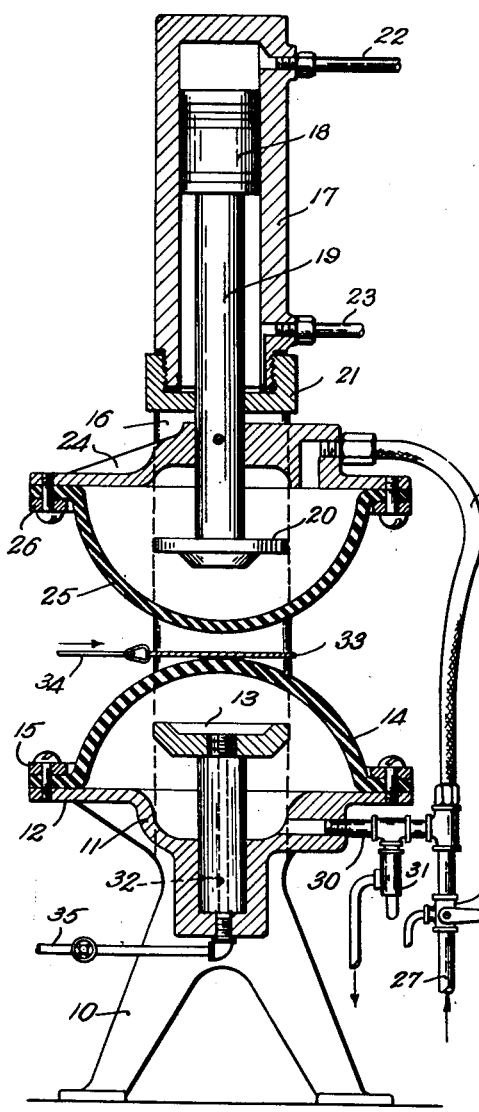
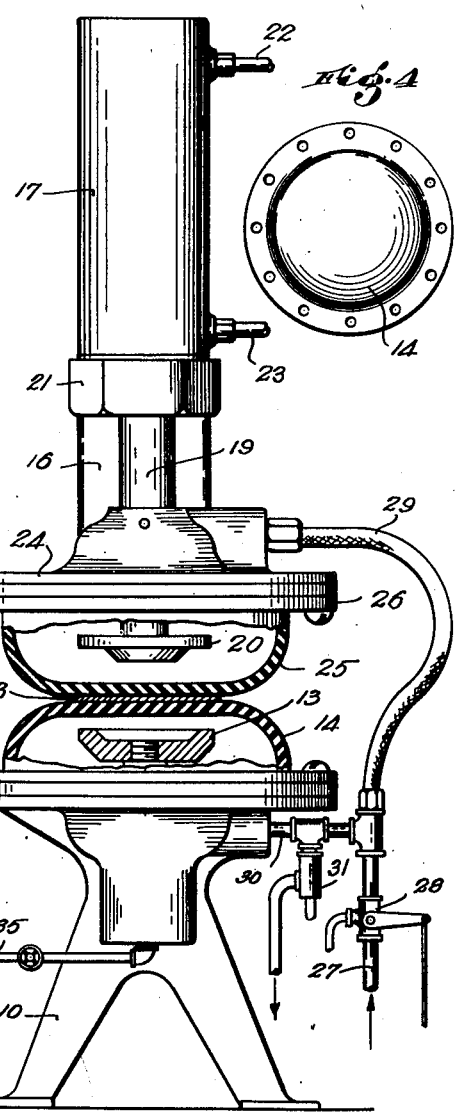
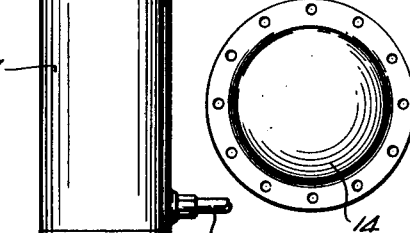
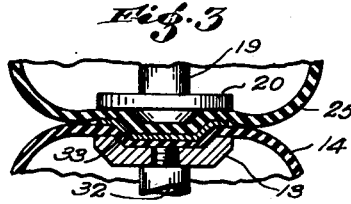
INVENTORS.
Walter B. Clifford &
Richard R. Walton
by Kenway & Witter
Attys.

Aug. 28, 1951 W. B. CLIFFORD ET AL 2,565,949
PROCESS AND APPARATUS FOR MOLDING SHEET MATERIAL
Filed April 12, 1947 2 Sheets-Sheet 2
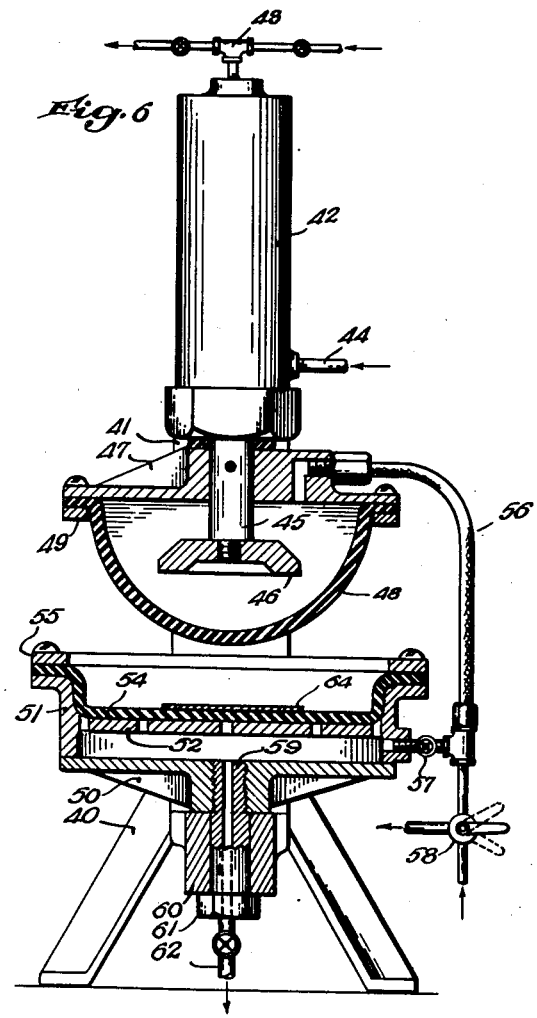
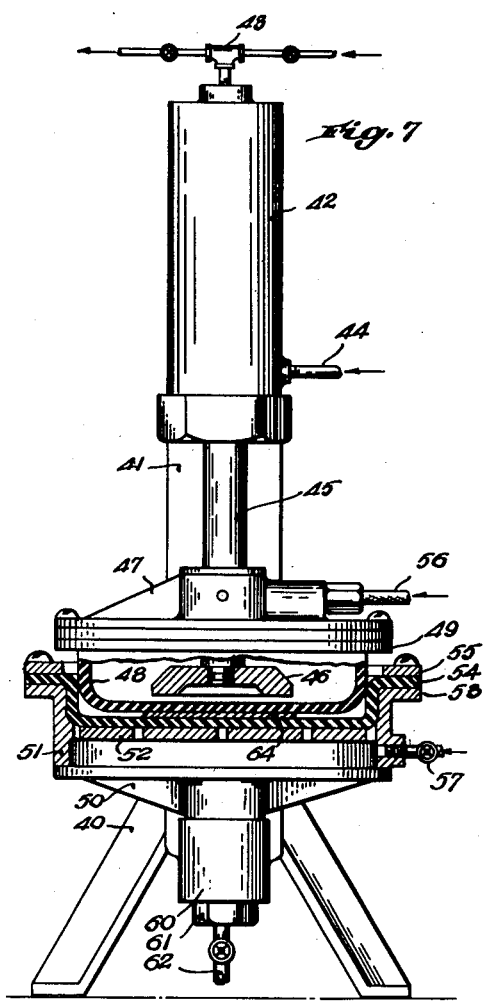
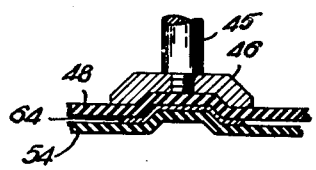
INVENTORS
Walter B. Clifford & Richard P. Walton
BY Kenway & Witter
Attys.

Patented Aug. 28, 1951

2,565,949

UNITED STATES PATENT OFFICE 2,565,949

PROCESS AND APPARATUS FOR MOLDING
SHEET MATERIAL

Walter B. Clifford and Richard R. Walton,
Boston, Mass.

Application April 12, 1947, Serial No. 741,104

10 Claims. (Cl. 113—44)

This invention comprises a new and improved process of molding sheet material, especially fibrous sheet material which has a tendency to crinkle or pleat under ordinary molding treatment.

We have discovered that paperboard, fibreboard, pasteboard or similar stock may be molded in wet or dry condition into three dimensional shapes of well defined contour, smoothly and without the formation of pleats, by first engaging the stock between flexible diaphragms which hold it securely in flat condition, and then conforming the blank by cooperating dies acting through said diaphragms. We propose to employ diaphragms of natural or synthetic rubber held in strong frictional engagement with the blank and powerfully controlling lateral flow or migration of the stock in the subsequent molding operation. The diaphragms also hold the material of the blank against such deformation as would result in the pleats that would occur if the sheet material were engaged directly by the forming dies.

The process of our invention is further characterized by the employment of diaphragms which are stretched or expanded before they are brought into engagement with the stock to be molded and then allowed to contract with the stock held between them in proportion to the shape and approaching movement of the dies. The stock being molded is, therefore, drawn inwardly by the contracting diaphragms and instead of being reduced in thickness by the drawing action of the dies, it may, in some cases, actually thicken in the molding operation. The diaphragms are held or clamped about their peripheries and accordingly the stretch imparted to them takes place between their clamped peripheries. This action may be visualized by assuming that the diaphragms are marked with a series of concentric circles spaced ½" apart. If the diaphragms are now stretched until the circles are spaced ⅝" apart and the stock engaged firmly between the expanded diaphragms, the area of the blank will be reduced by an extent equal to the contraction of the diaphragms back to the ½" spacing of the circles, when the diaphragms contract with the stock, assuming no slip occurs between the stock and the diaphragms.

The process of our invention may be carried out with diaphragms having an initial convex contour and which thus may be brought into preliminary engagement with a selected portion of the blank and then caused to engage it over a progressively increasing area as they are moved together under fluid pressure. Preferably and as herein shown, each diaphragm is used to enclose a portion of a fluid pressure chamber in which one of the forming dies is enclosed. Hydraulic or gaseous fluid pressure connections are provided for imparting an equal pressure and stretch to the diaphragms before bringing them into engagement with the blank for equalizing pressure upon the diaphragms and for releasing fluid pressure as required.

These and other features of the invention will be best understood and appreciated from the following description of preferred forms of apparatus whereby the process may be carried out, the apparatus being illustrated in the accompanying drawings, in which:

Fig. 1 is a view partly in elevation and partly in longitudinal section,

Fig. 2 is a view in front elevation, partly in section, showing the diaphragms in contact with the blank to be molded, Fig. 3 is a fragmentary sectional view illustrating the molding operation, Fig. 4 is a plan view of the lower diaphragm, Fig. 5 is a sectional view of a molded article, Figs. 6 and 7 are views of apparatus of modified form corresponding to Figs. 1 and 2, and Fig. 8 is a fragmentary view illustrating the molding operation as carried out by the said modified apparatus.

The process of our invention is not limited to or dependent upon any specific apparatus, although it may be conveniently carried out by that herein shown. The apparatus of Figs. 1 to 4 includes a frame 10 formed integral with a recessed table 11 having a circumferential flange 12. The female die 13 is stationary and is supported in a socket provided in the table 11. The die 13 is enclosed within a hemispherical diaphragm 14 which, in practice, may be formed of Hycar, neoprene or nylon or rubber about ¼" or somewhat thicker. The rim of the diaphragm is herein shown as securely held in place upon the metal flange 12 of the table by a clamping ring 15 which is secured to the table.

The frame 10 carries an upstanding arm 16 which is arranged to support a vertical cylinder 17. Within the cylinder operates a plunger providing a piston 18 on a vertical shaft 19. The shaft has at its lower end a threaded bore into which is screwed the stem of the male die 20. The lower end of the cylinder 17 is closed by a cap 21, and fluid pressure connections 22 and 23 for oil or gas provide means for reciprocating the piston within the cylinder 17. The shaft 19 carries at its lower end a recessed cap 24 having a circumferential flange to which the upper convex diaphragm 25 is secured by a clamping ring 26.

Fluid pressure is supplied to the pressure chambers formed by the diaphragms 14 and 25 by a supply pipe 27 provided with a three-way valve 28 and having a flexible connection 29 to the upper diaphragm. The recessed table of the lower diaphragm is connected through a nipple 30 to the supply pipe 27 and provided with a valve 31 arranged to act as a safety valve for the entire system.

The lower die 13 and its stem are provided with a vertical bore 32 leading to an inlet connection 35 in the bottom of the table 11. The connection 35 is herein shown as provided with a shut-off valve. The purpose of the bore and connection is to provide means for admitting fluid to the inner face of the die 13 to break the vacuum which is created there in the molding operation and thus to release the diaphragm 14 which would otherwise be held down in engagement with the die for a definite period after the molding operation.

In practice the two diaphragms 14 and 25 are first expanded by equal pressure of fluid admitted by opening the valve 28. Under this expanding pressure they both assume hemispherical or balloon form as shown in Fig. 1, being separated by a space permitting the convenient presentation between them of the blank 33 to be molded. Successive blanks may be presented by a feeding device 34, represented conventionally in Fig. 1, and which is effective to locate the blank symmetrically and concentrically in line with the axis of the diaphragms and the forming dies. The blank 33 is now engaged between the stretched diaphragms by downward movement of the piston 19 and the cap 24, this downward movement being continued until the diaphragms first contact with the center of the blank 33, then roll into engagement with it over a progressively increasing area, and finally becoming flattened, holding the blank in flat condition as shown in Fig. 2. It will be borne in mind that at this stage of the process the two diaphragms are maintained in substantially expanded condition.

As the blank 33 is engaged between the expanded diaphragms, the feeder 34 releases it and moves outwardly to an inoperative position. The forming die 20 is now advanced with respect to the lower forming die 13 to final molding position as indicated in Fig. 3. In this step of the process the expanding pressure upon the two diaphragms is reduced and the diaphragms are allowed to contract to an amount compensating for the distortion imparted to them by the forming dies 13 and 20. During the molding operation, therefore, the blank 33 is firmly engaged by the non-slipping surfaces of the diaphragms which are meanwhile contracting and thus tending powerfully to contract the material of the blank held between them; that is, the contracting action of the diaphragms not only prevents reduction in thickness of the blank by the drawing action of the dies, but tends to increase the thickness of the blank by drawing it uniformly and concentrically inwardly. At the same time the diaphragms are effective to prevent the formation of wrinkles or pleats in the molded material with the result that the finished article produced by the molding operation is smooth in all parts.

In the forming operation the lower diaphragm is forced into intimate engagement with the inner face of the lower concave die 13 and a vacuum is thus formed which holds the diaphragm in that position. While thus held the upper diaphragm is lifted and the molded blank thus freed for removal from the machine. After the molded blank has been removed, oil is admitted through the connection 35, the vacuum beneath the diaphragm is broken and it is released in preparation for the next cycle of operations. The molded blank 33' as shown in Fig. 5 will be found to have suffered no reduction in cross-section at any point due to the drawing action of the dies, and to present a continuous smooth surface without creases or pleats.

The process of our invention may be carried out in a somewhat modified manner by apparatus illustrated in Figs. 6 to 8, and will now be described. This includes a frame 40 having an upstanding arm 41 in which is supported a vertical cylinder 42 provided with pressure connections 43 and 44. Within the cylinder 42 is a piston, not shown, operating the rod or shaft 45 to the lower end of which is secured a female mold 46. This mold is arranged to be moved vertically in both directions by fluid pressure supplied to the cylinder and exhausted therefrom by the connections shown.

A cap 47 of circular outline is fastened to the shaft 45 and presents a flat lower face. To this face is secured a circular elastic diaphragm 48 by means of a binding ring 49. Fluid under pressure may be admitted to the chamber formed within the diaphragm 48, and the diaphragm may thus be blown up and expanded into semispherical shape as shown in Fig. 6.

The frame 40 also carries a stationary table 50 to which is secured a cylindrical casing 51 having a flat perforated partition 52. At its upper end the casing 51 has an outwardly directed angular flange 53 and to this is secured an elastic diaphragm 54 by means of a clamping ring 55.

A flexible fluid pressure pipe 56 is connected through a passage in the movable cap 47 to the chamber above the diaphragm 48 and through a valve nipple 57 to the chamber beneath the diaphragm 54 formed by the table 50 and the partition 52. A three-way valve 58 controls the admission and exhaust of a fluid pressure medium to the two diaphragm chambers.

The table 50 is perforated to receive the threaded stem 59 of a head 60 which underlies the table 50. The head 60 is held in place by a lock nut 61 and its stem provides a passage which is connected to a vacuum pipe 62. In the drawings the blank 64 which is to be molded is shown as resting upon the diaphragm 54.

In carrying out the process of our invention with the assistance of the apparatus above described, the diaphragm 48 is expanded by being blown into the semi-spherical shape shown in Fig. 6, and the diaphragm 54 is expanded by being drawn by suction created through the connection 62 into conformity with the partition 52 and the inner walls of the casing 51. The diaphragm 54 is thus sucked into a position in which it presents a flat face in line with and beneath the diaphragm 48 and in which it is substantially expanded from its normal condition. The fibrous blank 64 to be molded is now placed upon the flat surface of the expanded diaphragm 54 and the piston rod 45, together with the mold 46 and the diaphragm 48, are moved downwardly into the position shown in Fig. 7. In this step of the process the diaphragm 48 first engages the central area of the blank 64 and then rolls outwardly into complete engagement with it, finally assuming the flattened shape shown in Fig. 7. The die 46 has meanwhile been brought into engagement with the inner surface of the diaphragm 48, and the blank 64 is now firmly engaged and pressed into flat condition. Suction applied to the diaphragm 54 through the connection 62 is now cut off and pressure admitted through the connection 57 so that the diaphragm 54 is forced upwardly and the blank 64 is molded in cooperation with the mold 46, as suggested in Fig. 8. In this operation pressure upon the diaphragm 48 may be reduced and the diaphragm allowed to contract and so compensate for the expansion which would otherwise take place in the material of the blank in being conformed from its original flat condition to a three-dimensional shape. The molded blank, therefore, suffers no reduction in cross-section due to the drawing action of the dies and remains smooth and entirely free from wrinkles or pleats.

It will be noted that by means of the connections above described, the two diaphragms may be subjected independently to different pressure conditions and thus expanded to different degrees and at different stages of the cycle if desired.

The diaphragms 48 and 54 may be formed of natural or any selected synthetic rubber, usually in flat circular form from ¼" to ½" in thickness, but in some instances it may be desirable to mold the diaphragms into an approximation of the shapes shown in Fig. 6.

Having thus disclosed our invention and described in detail illustrative examples of its application, we claim as new and desire to secure by Letters Patent:

1. The process of molding fibrous sheet stock, which includes the steps of engaging the stock between opposed prestretched elastic diaphragms, and while so engaged imparting three-dimensional contour to the stock by dies acting through the diaphragms and simultaneously permitting the diaphragms to contract in proportion to the stock drawn inwardly by the dies.

2. The process of molding fibrous sheet stock as defined in claim 1 further characterized in that one of the diaphragms is expanded into contact with a flat supporting surface, that a flat blank is placed upon the said diaphragm and engaged from above by a prestretched diaphragm.

3. The process of molding fibrous sheet stock as defined in claim 1 further characterized in that one of the elastic diaphragms is prestretched by blowing it up while the second diaphragm is prestretched by sucking it against a supporting surface.

4. The process of molding fibrous sheet stock, which includes the steps of stretching a pair of opposed elastic diaphragms, engaging the stock between the stretched diaphragms, allowing the diaphragms to contract with the stock held between them, and simultaneously with such contraction imparting three-dimensional contour to the stock by dies acting through the diaphragms and drawing in the stock at substantially the same rate it is moved by contraction of the diaphragms.

5. The process of molding fibrous stock, which includes the steps of expanding a pair of opposed elastic diaphragms into approximately hemispherical shape, forcing the expanded diaphragms into engagement with a flat blank of fibrous stock and thereby flattening the diaphragms against the stock over a substantial area thereof, then forcing forming dies against the stock through the interposed diaphragms, and simultaneously permitting the diaphragms to contact at substantially the same rate that the stock is drawn inwardly by the action of the forming dies.

6. The process of molding fibrous sheet stock, which includes the steps of first expanding oppositely disposed circular elastic diaphragms, next engaging a fibrous blank between the expanded diaphragms, and then molding the blank by dies acting through the diaphragms and at the same time permitting the expanded diaphragms to contract.

7. The process of molding fibrous sheet stock, which includes the steps of blowing up oppositely disposed circular elastic diaphragms into balloon form, moving together and flattening the blown-up diaphragms with a blank interposed between them, and molding the flat blank by dies acting through the diaphragms.

8. The process of molding fibrous sheet stock, comprising the steps of blowing up elastic diaphragms by internal pressure to balloon form, flattening the diaphragms by pressure against each other with a blank interposed between them, molding the blank by dies acting through the diaphragms and at the same time forming a vacuum between one diaphragm and its die, separating the diaphragms to release the molded blank while one diaphragm is held by vacuum, and finally releasing the said diaphragm.

9. Molding apparatus comprising relatively movable supports each carrying an elastic diaphragm and forming therewith a pressure chamber, fluid pressure connections to each of said chambers whereby the diaphragms may be expanded, provision for relieving pressure upon the diaphragms and permitting them to contract while maintained in pressure engagement with an interposed blank, and a three-dimensional die movable to act upon the blank while so engaged.

10. The process of molding conformable sheet stock, which includes the steps of engaging the stock between opposed pre-stretched elastic diaphragms, and while so engaged imparting three-dimensional contour to the stock by a die acting through one of the diaphragms and simultaneously permitting at least one of the diaphragms to contract during the molding step in proportion to the stock displaced by the die.

WALTER B. CLIFFORD.
RICHARD R. WALTON.

REFERENCES CITED

The following references are of record in the file of this patent:

UNITED STATES PATENTS

| Number | Name | Date |
|---|---|---|
| 1,063,084 | Thomson | May 27, 1913 |
| 1,206,656 | Benedictus | Nov. 28, 1916 |
| 1,275,926 | Hughes | Aug. 13, 1918 |
| 1,318,044 | Bechman | Oct. 7, 1919 |
| 1,547,871 | Gaunberg | July 28, 1925 |
| 1,637,532 | Oliver | Aug. 2, 1927 |
| 1,643,147 | Angier | Sept. 20, 1927 |
| 1,806,861 | Owen | May 26, 1931 |
| 1,844,487 | Tyrrell | Feb. 9, 1932 |
| 2,298,037 | Crandell | Oct. 6, 1942 |
| 2,406,738 | Brophy | Sept. 3, 1946 |

FOREIGN PATENTS

| Number | Country | Date |
|---|---|---|
| 180,489 | Great Britain | of 1922 |
| 191,057 | Switzerland | of 1937 |
| 283,685 | Great Britain | Jan. 18, 1928 |